United States Patent
Yamashita et al.

(10) Patent No.: US 6,970,094 B2
(45) Date of Patent: Nov. 29, 2005

(54) REMOTELY ACCESSIBLE COMBINATION WEIGHING APPARATUS AND COMBINATION WEIGHING SYSTEM

(75) Inventors: Kazuhiko Yamashita, Akashi (JP); Masafumi Takimoto, Akashi (JP)

(73) Assignee: Yamato Scale Co., Ltd., Hyogo (JP)

( * ) Notice: Subject to any disclaimer, the term of this patent is extended or adjusted under 35 U.S.C. 154(b) by 116 days.

(21) Appl. No.: 10/031,560

(22) PCT Filed: Feb. 23, 2001

(86) PCT No.: PCT/JP01/01339

§ 371 (c)(1),
(2), (4) Date: Oct. 25, 2001

(87) PCT Pub. No.: WO01/63226

PCT Pub. Date: Aug. 30, 2001

(65) Prior Publication Data

US 2003/0016660 A1 Jan. 23, 2003

(30) Foreign Application Priority Data

Feb. 28, 2000 (JP) .................................. 2000-051344

(51) Int. Cl.$^7$ .......................... G08B 21/00; G01G 13/00
(52) U.S. Cl. ............... 340/666; 340/825.69; 340/539.1; 340/531; 700/305; 702/101; 702/173; 705/414; 200/85 R; 177/25.18
(58) Field of Search ................................. 340/666, 665, 340/667, 825.69, 825.72, 539.1, 531; 700/305; 701/117, 124; 702/101, 173, 174, 187, 188; 705/414–416; 200/85 R, 86 R, DIG. 35, 75 R; 177/25.18, 145, 25.13, 25.19; 180/290

(56) References Cited

U.S. PATENT DOCUMENTS

| 4,662,462 A | | 5/1987 | Kitagawa et al. |
| 5,410,109 A | * | 4/1995 | Tarter et al. ................. 177/136 |
| 5,528,499 A | * | 6/1996 | Hagenbuch ................... 701/50 |
| 5,710,706 A | | 1/1998 | Markl et al. ................. 235/375 |
| 5,780,782 A | * | 7/1998 | O'Dea ........................ 177/136 |
| 5,802,859 A | | 9/1998 | Zugibe |
| 5,878,376 A | * | 3/1999 | Schurr ........................ 702/102 |
| 6,411,678 B1 | * | 6/2002 | Tomlinson, Jr. et al. .... 702/179 |
| 6,437,692 B1 | * | 8/2002 | Petite et al. ................. 340/531 |
| 6,576,849 B2 | * | 6/2003 | Bliss et al. .............. 177/25.13 |
| 6,580,037 B1 | * | 6/2003 | Luke ....................... 177/25.13 |

FOREIGN PATENT DOCUMENTS

| DE | 44 24 826 A1 | 2/1995 |
| EP | 0 825 424 A2 | 2/1998 |
| EP | 0 825 425 A2 | 2/1998 |
| EP | 0 281 797 A2 | 9/1998 |
| JP | 5-288596 | 11/1993 |

OTHER PUBLICATIONS

"A Communication System Not Only for Weighing Techniques," Dipl.–Ing H.D. Kerl, messen prüfen automatisieren, Jul./Aug. 1995, pp. 1–8.

"Development trends in automated weighing techniques," K. Clevermann, Technisches Messen TM, vol. 58, No. 5, May 1, 1991, pp. 1–8.

European Search Report for European Patent Application No. 01 906 240.5 dated Jul. 28, 2004.

* cited by examiner

*Primary Examiner*—Donnie L. Crosland

(57) ABSTRACT

In a combination weighing system, a connection is established by Internet between a combination weighing apparatus comprising a weighing machine control portion for setting an operating condition of a weighing machine and logging an operating state of the weighing machine; and a network connecting device for receiving setting information of the operating condition and transmitting log information of the operating state, and a server computer that includes a network connecting device and manages the setting information of the operating condition and the log information of the operating state. With this combination weighing system, it is possible to set the operating condition of the combination weighing apparatus without a need for a person in charge to go to a place where the combination weighing apparatus is installed and to stop an operation of the combination weighing apparatus.

16 Claims, 9 Drawing Sheets

REMOTELY ACCESSIBLE COMBINATION WEIGHING APPARATUS AND COMBINATION WEIGHING SYSTEM

TECHNICAL FIELD

The present invention relates to a combination weighing apparatus and a combination weighing system. More particularly, the present invention relates to a remotely accessible combination weighing apparatus and a combination weighing system in which the combination weighing apparatus and a server computer are connected by means of a communication medium such as Internet.

BACKGROUND ART

Conventionally, combination weighing apparatuses are installed in various places and used. In the combination weighing apparatus, it is important to set an appropriate operating condition thereof and log an operating state thereof in order to maintain a normal operation of the weighing apparatus, avoid a failure thereof, or quickly restore the apparatus from the failure.

In actuality, however, in the conventional combination weighing apparatus, to obtain setting information of the operating condition or a log of the operating state, a person in charge goes to a place where the combination weighing apparatus is installed and brings back data printed out by a printer or the like to a center, or an operator present at the installation place sends the printed-out data to the center via facsimile, mail, or the like.

To change setting of the condition operating, there has been conventionally adopted a method in which the person in charge carries the printed-out data to the installation place of the combination weighing apparatus and inputs the data into a control portion of the combination weighing apparatus or sends the data to the installation place via facsimile, mail, or the like, or the operator inputs data values given by a telephone or the like.

However, in the above-described conventional method, the following three problems arise. The first problem is that it takes some time the person in charge to go to the installation place of the weighing apparatus or the operator to print out the data and send it via facsimile, mail, or the like, and the weighing using the combination weighing apparatus cannot be carried out when trouble occurs.

The second problem, which is associated with the above, is that a labor cost of the person in charge, a traveling expense of the person in charge, a mailing cost, and so forth are needed.

The third problem is that the person in charge or the operator sometimes makes a mistake or skips some data in inputting set values for the operating condition due to the fact that he/she inputs data while seeing the data written on a paper.

DISCLOSURE OF THE INVENTION

A remotely accessible combination weighing apparatus of the present invention comprises: a weighing machine constituting the combination weighing apparatus; a weighing machine control portion for setting an operating condition of the weighing machine and logging an operating state of the weighing machine; and a communication device for transmitting and receiving electronic information including setting information of the operating condition and/or log information of the operating state via a communication medium.

With this configuration, the setting information of the operating condition and the log information of the operating state of the combination weighing apparatus can be obtained by a remote operation via the communication medium, and, therefore, the person in charge need not go to the place where the weighing apparatus is installed. In addition, mistakes, skipping of some data, or the like in inputting the operating condition can be avoided.

The communication medium in the remotely accessible combination weighing apparatus of the present invention is selected from the group consisting of a local area network, a wide area network, a public line, Internet, a value added network, a commercial network, and combinations thereof. With the use of these media as communication media, the setting of the operating condition of the combination weighing apparatus and the logging of the operating state of the combination weighing apparatus can be performed without providing a dedicated line.

The communication device can be connected to the communication medium, and in general, the communication device is selected from the group consisting of a modem, a terminal adapter, and a router.

The remotely accessible combination weighing apparatus of the present invention may further comprise means for storing the setting information of the operating condition and the log information of the operating state. The storing means enables the setting information of the operating condition to be retained therein until it becomes necessary or the history of the setting information of the operating condition to be retained therein. In addition, the storing means enables the log information of the operating state to be stored and retained therein, or the history of the log information of the operating state to be retained therein until a request for transmission of the history is made.

The log information of the operating state is selected from the group consisting of a control set value, an input key history, inter-process communication information, operation error information, and image information. The control set value refers to a parameter that determines an operation of the weighing machine. The input key history refers to a log of keys input from a past predetermined time to a present time. The inter-process communication information refers to information by which processes being executed by respective portions of the combination weighing apparatus are synchronized with one another. The operation error information refers to a log of types, causes, or the like of an error occurring during the operation of the weighing machine. The image information refers to a log of the operating state of the combination weighing apparatus as still pictures or moving pictures.

The setting information of the operating condition may include the control set value.

In the remotely accessible combination weighing apparatus of the present invention, the electronic information may have a format of an electronic mail. Herein, the format of the electronic mail refers to a format in which the electronic information is transmitted to a specified destination to which it is to be transmitted. Such a format of the electronic information is advantageous because it allows the apparatus and a communication partner to give and receive the electronic information without providing a transmission path between them and it is advantageous that both of them to give and receive the electronic information at different times. In the present invention, other than the format of the electronic mail, for example, the electronic information may have a format in which it is placed on Internet and can be accessed by specified or unspecified one or a plurality of users.

The remotely accessible combination weighing apparatus of the present invention may further comprise electronic information analyzing means for analyzing the electronic information incorporating the setting information of the operating condition in a predetermined format to extract the setting information of the operating condition. This electronic information analyzing means may be constituted by a computer and a program, for example.

Further, the remotely accessible combination weighing apparatus of this invention may further comprise electronic information creating means for incorporating the log information of the operating state into the electronic information in a predetermined format. This electronic information creating means may also be constituted by the computer and the program, for example.

A combination weighing system of the present invention comprises a combination weighing apparatus; a server computer; and a communication medium. The combination weighing apparatus in the combination operating system of the present invention, comprises: a weighing machine constituting the combination weighing apparatus; a weighing machine control portion for setting an operating condition of the weighing machine and logging an operating state of the weighing machine; and a communication device for transmitting and receiving electronic information including setting information of the operating condition and log information of the operating state. The server computer includes a central communication device for performing communication with the communication device and manages the setting information of the operating condition and the log information of the operating state in the electronic information. The communication medium in the combination weighing system of the present invention is provided for performing communication between the communication device and the central communication device.

With this configuration, the setting of the operating condition of the combination weighing apparatus and the logging of the operating state of the combination weighing apparatus can be performed by a remote operation of the server computer via the communication medium. Therefore, the person in charge need not go to the place where the weighing apparatus is installed. In addition, since the operating condition can be set by the operation of the server computer, mistakes, skipping of some data, or the like in inputting data can be avoided.

The communication medium in the combination weighing system of the present invention is selected from the group consisting of a local area network, a wide area network, a public line, Internet, a value added network, a commercial network, and combinations thereof. With the use of these media as the communication media, the setting of the operating condition and the logging of the operating state of the combination weighing apparatus can be performed without providing a dedicated line between the combination weighing apparatus and the server computer.

The communication device can be connected to the communication medium described above and is generally selected from the group consisting of a modem, a terminal adapter, and a router.

The combination weighing apparatus in the combination weighing system of the present invention may further comprise means for storing the setting information of the operating condition and the log information of the operating state. The storing means enables the setting information of the operating condition to be retained therein until it becomes necessary, or the history of setting information of the operating condition to be retained therein. In addition, the storing means enables the log information of the operating state to be stored and retained therein, or the history of the log information of the operating state to be retained therein until a request for transmission of the history is made.

Similarly to the above, the log information of the operating state is selected from the group consisting of a control set value, an input key history, inter-process communication information, operation error information, and image information.

The setting information of the operating condition may include the control set value.

In the combination operating system of the present invention, the electronic information may have the format of the electronic mail. Here, as described above, the format of the electronic mail refers to the format in which the electronic information is transmitted only to a specified destination to which it is to be transmitted. This is advantageous because it allows the apparatus and a communication partner to give and receive the electronic information without providing a transmission path between them and it is advantageous that both of them can give and receive the electronic information at different times. In the present invention, other than the format of the electronic mail, for example, the electronic information may have a format in which it is placed on Internet and can be accessed by specified or unspecified one or a plurality of users.

Further, in the combination weighing system of the present invention, the server computer may further comprise electronic information creating means for incorporating the setting information of the operating condition into the electronic information in a predetermined format, and the combination weighing apparatus may further comprise electronic information analyzing means for analyzing the electronic information incorporating the setting information of the operating condition in the predetermined format to extract the setting information of the operating condition. Each of the electronic information creating means and the electronic information analyzing means may be constituted by the computer and the program, for example.

In the combination weighing system of the present invention, the combination weighing apparatus may further comprise electronic information creating means for incorporating the log information of the operating state into the electronic information in a predetermined format, and the server computer may further comprise electronic information analyzing means for analyzing the electronic information incorporating the log information of the operating state in the predetermined format to extract the log information of the operating state. Also, in this configuration, each of the electronic information analyzing means and the electronic information creating means may be constituted by the computer and the program, for example.

As described above, in the remotely accessible combination weighing apparatus and the combination weighing system of the present invention, the person in charge need not go to the place where the weighing apparatus is installed, or the operator need not print out data and send the printed-out data via facsimile, mail, or the like. Besides, the time period during which the operation of the combination weighing apparatus must be stopped can be significantly reduced. This advantageously reduces the labor cost of the person in charge, the traveling expense of the person in charge, the mailing cost, and so forth. Moreover, when the set values for the operating condition are input, mistakes, skipping of some data, and the like that might be caused by the person in charge or the operator who sees the data written on the paper do not occur.

BEST MODE FOR CARRYING OUT THE INVENTION

Hereinafter, an embodiment of the present invention will be described with reference to drawings, but the present invention is not limited to the embodiment described below.

Figure 1:
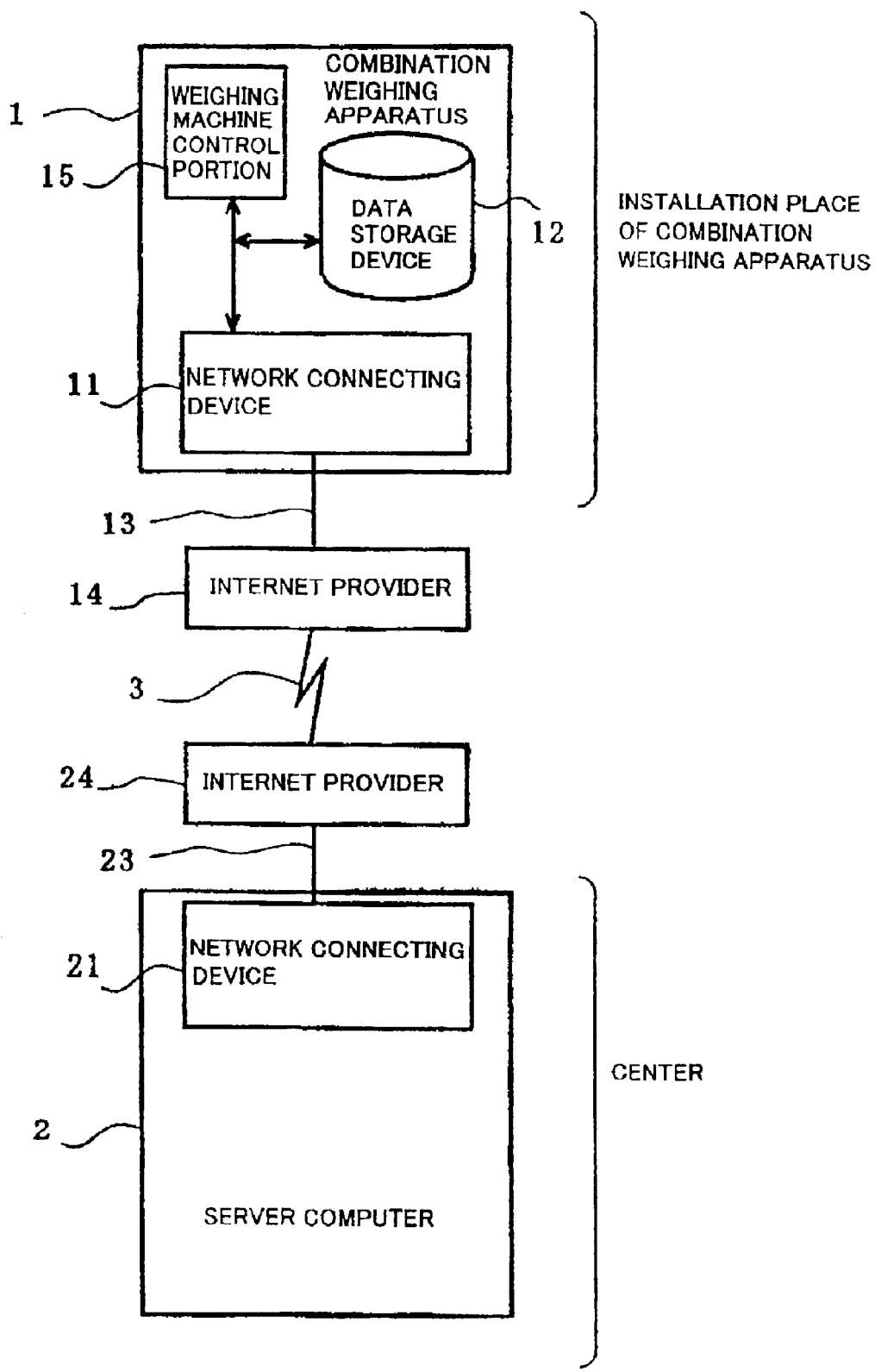
FIG. 1 is a view schematically showing a configuration of a combination weighing system according to an embodiment of the present invention.

FIG. 1 is a view schematically showing a configuration of a combination weighing system according to an embodiment of the present invention. The combination operating system of the present invention comprises a remotely accessible combination weighing apparatus 1, and a server computer 2 installed in a center to manage the combination weighing apparatus 1. The combination weighing apparatus 1 comprises a data storage device 12 for storing setting information of an operating condition and log information of an operating state, a network connecting device 11 as a communication device, a weighing machine control portion 15 for setting the operating condition of a weighing machine (not shown) and logging the operating state of the weighing machine, and the like. The network connecting device 11 is connected to an Internet provider 14 by means of a public line 13. The server computer 2 comprises a network connecting device 21 connected to an Internet provider 24 by means of a public line 23.

Further, the Internet provider 14 and the Internet provider 24 are interconnected by Internet 3. In the combination weighing system of this embodiment, transmission and reception of the setting information of the operating condition and the log information of the operating state are performed in a format of an electronic mail between the combination weighing apparatus and the server computer.

Figure 2:
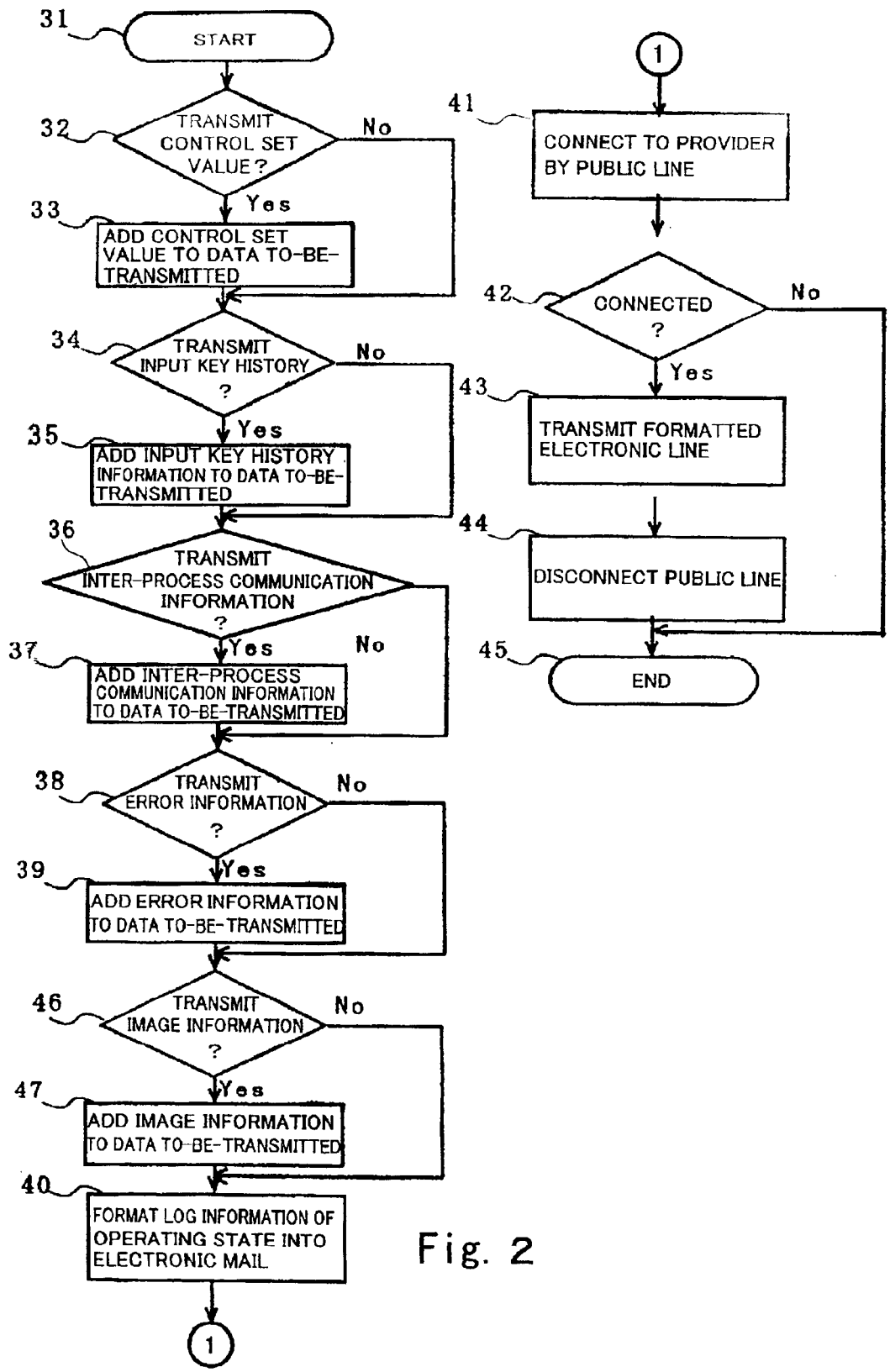
FIG. 2 is a flowchart showing a transmission operation of an electronic mail performed by a combination weighing apparatus in the combination operating system of FIG. 1.

In the combination operating system of FIG. 1, according to a flowchart of FIG. 2, the log information of the operating state is transmitted in the format of the electronic mail from the combination weighing apparatus 1. First of all, in Step 31, processing starts, and in Step 32, an inquiry as to whether or not to transmit a control set value is made. When the control set value should be transmitted, in Step 33, the control set value is added to data to-be-transmitted, and then the processing goes to Step 34. When the control set value should not be transmitted, the processing goes from Step 32 to Step 34.

Subsequently, in Step 34, an inquiry as to whether or not to transmit an input key history is made. When the input key history should be transmitted, in Step 35, the input key history is added to the data to-be-transmitted, and then the processing goes to Step 36. When the input key history should not be transmitted, the processing goes from Step 34 to Step 36.

Then, in Step 36, an inquiry as to whether or not to transmit inter-process communication information is made. When the inter-process communication information should be transmitted, in Step 37, the inter-process communication information is added to the data to-be-transmitted, and then the processing goes to Step 38. When the inter-process communication information should not be transmitted, the processing goes from Step 36 to Step 38.

Then, in Step 38, an inquiry as to whether or not to transmit error information is made. When the error information should be transmitted, in Step 39, the error information is added to the data to-be-transmitted, and then the processing goes to Step 46. When the error information should not be transmitted, the processing goes from Step 38 to Step 46.

Then, in Step 46, an inquiry as to whether or not to transmit image information is made. When the image information should be transmitted, in Step 47, the image information is added to the data to-be-transmitted, and then the processing goes to Step 47. When the image information should not be transmitted, the processing goes from Step 46 to Step 40.

Then, in Step 40, the log information of the operating state created in Steps 31–39 and Steps 46, 47 is formatted into the electronic mail.

Then, in Step 41, the network connecting device 11 (FIG. 1) tries to establish a connection to the Internet 3 by means of the public line 13 and the Internet provider 14. In Step 42, it is judged whether or not the connection to the Internet 3 has been established. When it is judged that the connection has been established, in Step 43, the formatted electronic mail is transmitted. Thereafter, in Step 44, the line is disconnected and in Step 45, the processing ends. When it is judged that the connection to the Internet 3 has not been established in Step 42, in Step 45, the processing ends.

It should be noted that Steps 41, 42, 44 can be omitted in a case where the line connecting device is always connected to the Internet.

The electronic mail transmitted as described above is sent via the Internet providers 14, 24 and the public lines 13, 23 of FIG. 1 and received by the network connecting device 21 of he server computer 2 in the center.

Figure 4:
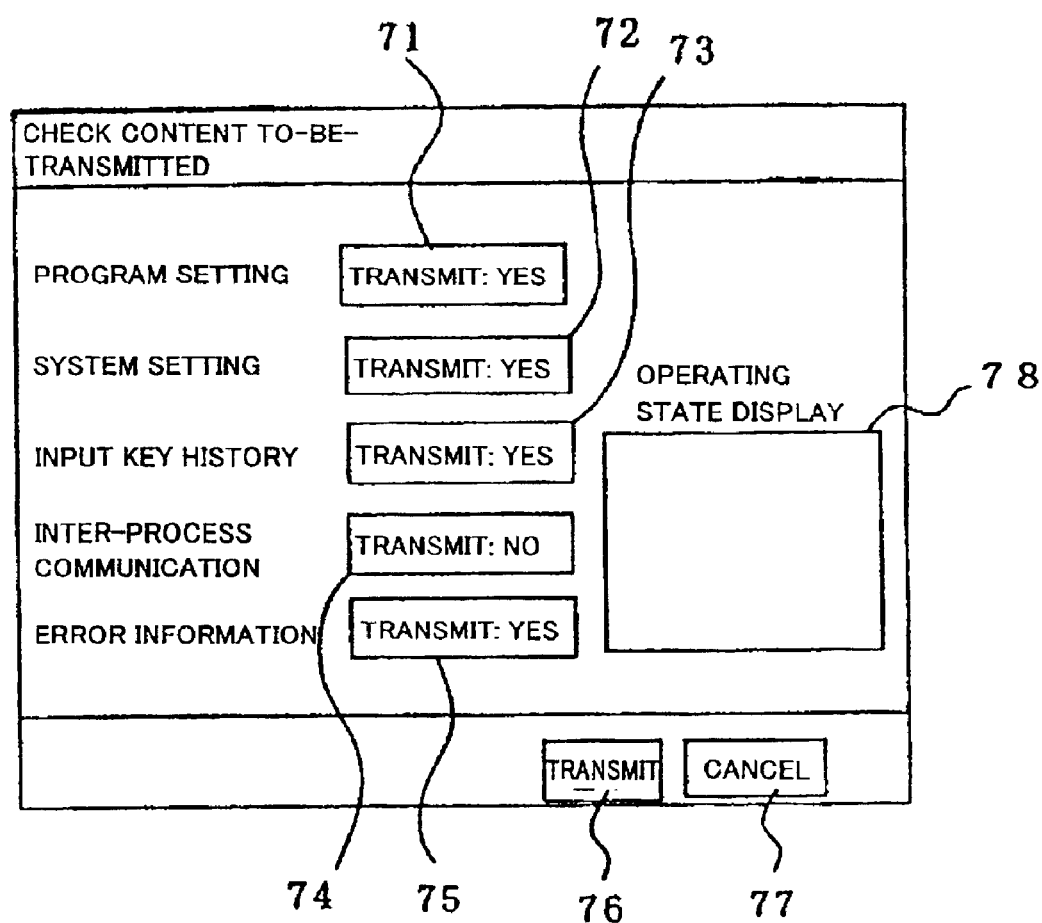
FIG. 4 is a view showing a screen on which log information of an operating state of the combination weighing apparatus which is to be transmitted is selected.

FIG. 4 shows a screen on which the log information of the operating state which is to be transmitted is selected in the Steps 32–40. In FIG. 4, "program setting" and "system setting" correspond to "setting of the control set values". The image information composed of still pictures or moving pictures is displayed on an image display window 78 and visually checked before transmitted. In this embodiment, whether each of the program setting, the system setting, the input key history, the inter-process communication information, the error information and the image information is transmitted or not is determined by inputting a transmission or non-transmission instruction into each of input boxes 71–75. In this embodiment, by clicking a TRANSMIT button 76 on the screen, the log information of the operating state is formatted into the electric mail, and then transmitted to a mail server of the Internet 3 via the Internet provider 14 and the public line 13. Further, the electric mail placed in the mail server on the Internet 3 and containing the log information of the operating state is sent via the Internet provider 24 and the public line 23 and received by the server computer 2 in the center. The transmission can be cancelled by clicking a CANCEL button 77 of FIG. 4.

Figure 3:
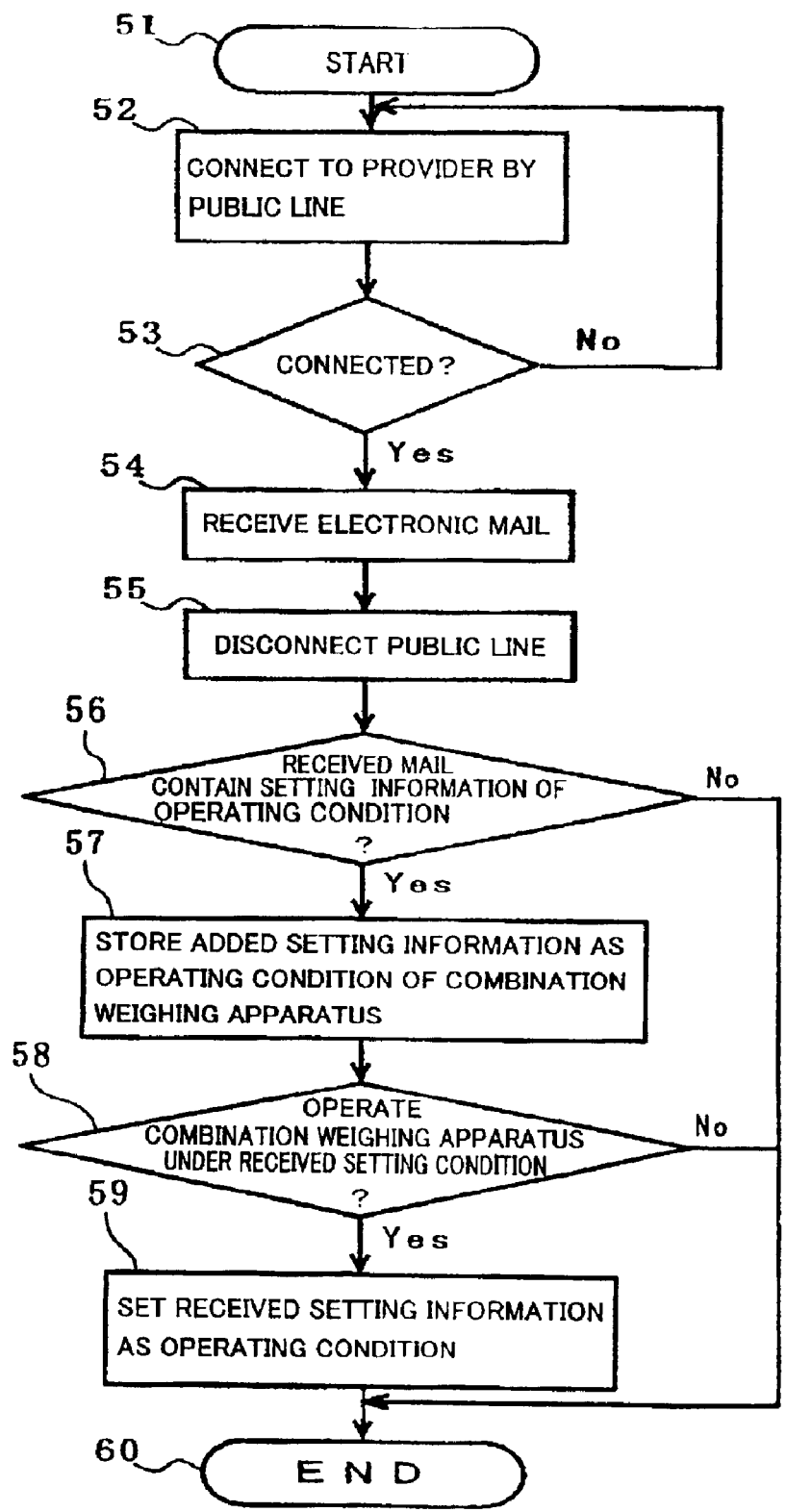
FIG. 3 is a flowchart showing a receive operation of the electronic mail performed by the combination weighing apparatus in the combination operating system of FIG. 1.

FIG. 3 is a flowchart showing a case where the combination weighing apparatus 1 receives the electronic mail containing the setting information of the operating condition. Here, it is assumed that the electronic mail has been transmitted from the network connecting device 21 of the server computer 2 in the center to the mail server on the Internet 3 via the Internet provider 24. In Step 51, the combination weighing apparatus 1 starts processing. In Step 52, the combination weighing apparatus 1 tries to establish a connection to the Internet 3 by means of the public line 13 and the Internet provider 14 in order to receive the electronic mail. When the connection has not been established, in Step 53, the combination weighing apparatus 1 retries to establish the connection. When the connection to the Internet 3 has been established, in Step 54, the combination weighing apparatus 1 receives the electronic mail from the mail server of the Internet 3. Then, in Step 55, the public line 13 is disconnected. It should be noted that Steps 52, 53, 55 can be omitted in the configuration in which the combination weighing apparatus 1 is always connected to the Internet 3.

Then, in Step 56, it is checked whether or not the received electronic mail contains added setting information of the operating condition. When it is checked that the electronic mail contains the added setting information, in Step 57, the information is stored in the data storage device 12 as the control set values for the combination weighing apparatus 1, and the processing goes to Step 58. When it is checked that the electronic mail does not contain the added setting information of the operating condition, the processing goes to Step 60 and ends herein.

Figure 5:
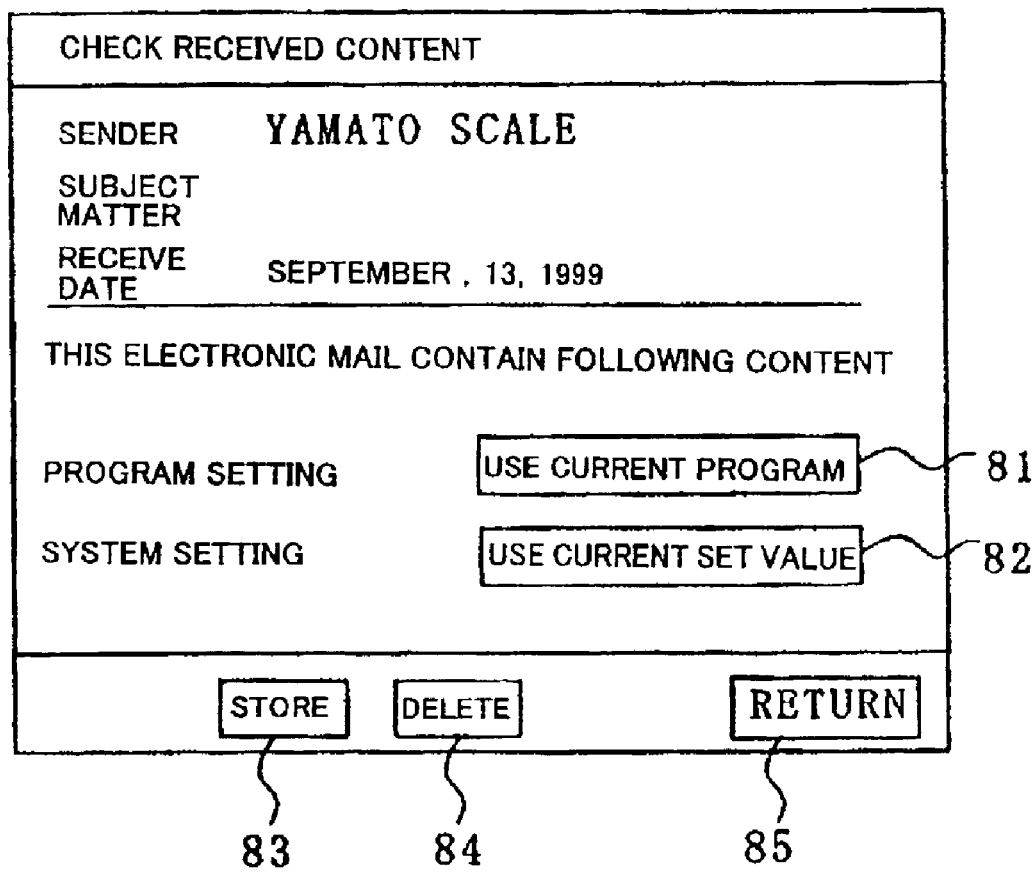
FIG. 5 is a view showing a screen on which a content of a received electronic mail in the combination weighing apparatus is checked.

FIG. 5 shows a screen on which a content of the received electronic mail is checked. The control set values in the electronic mail are displayed on display boxes 81, 82. In FIG. 5, the program setting value indicates a current program, i.e., a program being used continues to be used without change (display box 81) and the received set value indicates that a current set value, i.e., a system setting value being used continues to be used without change (display box 82). In this embodiment, by clicking a STORE button 83 on the screen, the control set values are stored in the data storage device 12 (FIG. 1). Also, by clicking a DELETE button on the screen, the control set values on the screen are deleted.

In Step 58, it is inquired of the operator whether or not the received control set values for the setting information of the operating condition should be adopted as the control set values for current operation. When the received control set values for the setting information of the operating condition should be adopted as the control set values for the current operation, in Step 59, the received control set values are input to the weighing machine control portion 15 (FIG. 1), and thereafter, the weighing machine is operated according to this control set values. Finally, with a click of a RETURN button 85 of FIG. 5, the display screen terminates, and the processing ends in Step 60.

Figure 8:
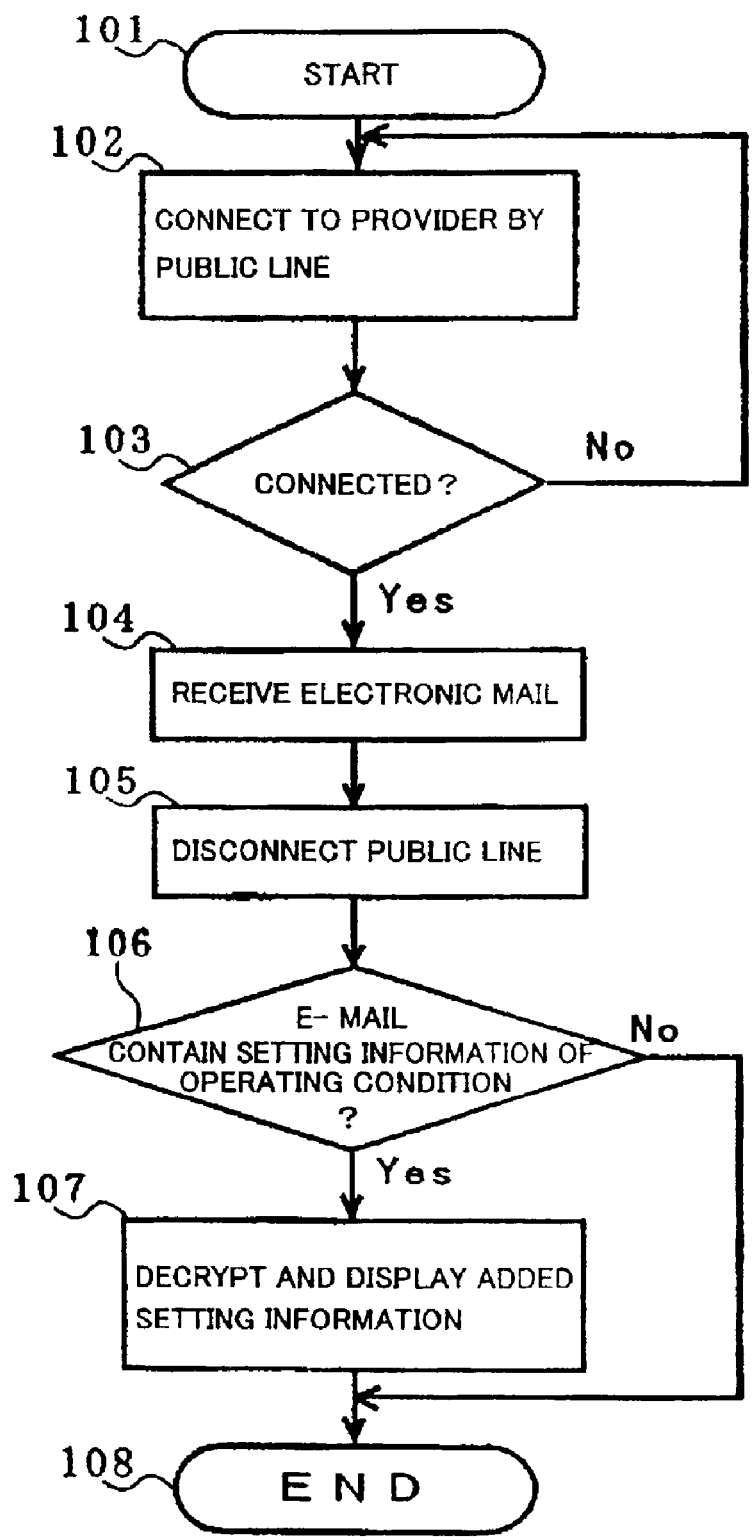
FIG. 8 is a flowchart showing a receive operation of the electronic mail performed by the server computer in the combination operating system according to an embodiment of the present invention.

FIG. 8 is a flowchart showing a receive operation of the electronic mail performed by the server computer 2 in the combination weighing system of FIG. 1. In the reception of the electronic mail, as shown in FIG. 8, first of all, in Step 101, processing starts, and then in Step 102, the network connecting device 21 (FIG. 1) tries to establish a connection to the Internet 3 by means of the public line 23 and the Internet provider 24. In Step 103, it is judged whether or not the connection to the Internet 3 has been established. When it is judged that the connection has been established, in Step 104, the electronic mail is received. Thereafter, in Step 106, it is judged whether or not the electronic mail contains added setting information of the operating condition. When it is judged that the electronic mail contains the added setting information of the operating condition, in Step 107, the added setting information is decrypted and displayed, and in Step 108, the processing ends. When it is judged that the electronic mail does not contain the added setting information of the operating condition in Step 106, the processing directly goes to Step 108 and ends herein.

Also in the above-described case, Steps 102, 103, 105 can be omitted in the case where the connection to the Internet is always established.

Figure 9:
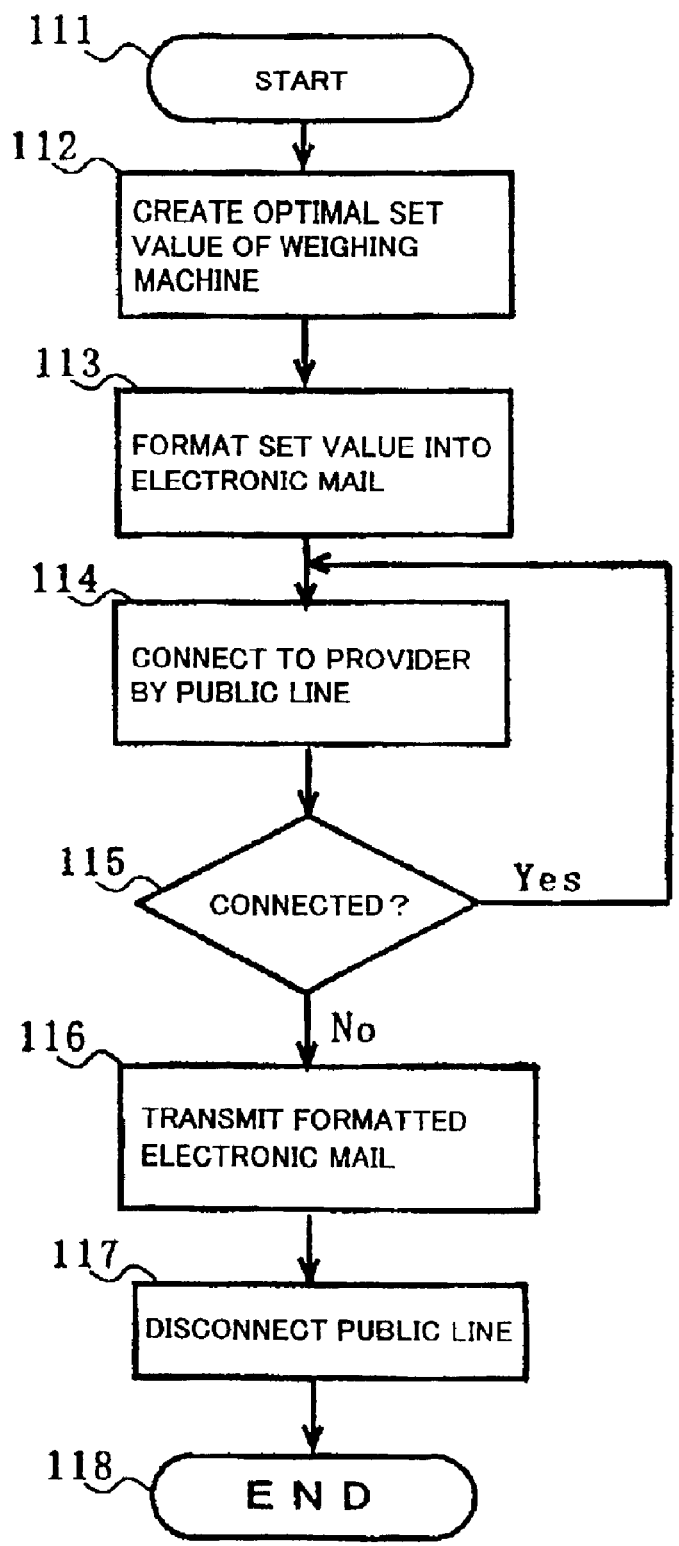
FIG. 9 is a flowchart showing a transmission operation of the electronic mail performed by the server computer in the combination weighing system according to the embodiment of the present invention.

FIG. 9 is a flowchart showing a transmission operation of the electronic mail performed by the server computer 2 in the combination weighing system of FIG. 1. In transmission of the electronic mail, as shown in FIG. 9, first of all, in Step 111, the processing starts, and in Step 112, optimal set values for the operating condition of the weighing machine of the combination weighing apparatus 1 are created. Then, in Step 113, the set values are formatted into the electronic mail. Then, in Step 114, the network connecting device 11 (FIG. 1) tries to establish the connection to the Internet 3 by means of the public line 13 and the Internet provider 14. In Step 115, it is judged whether or not the connection to the Internet 3 has been established, and when it is judged that the connection has been established, in Step 116, the electronic mail is transmitted. When it is judged that the connection to the Internet 3 has not been established in Step 115, the processing goes back to Step 114, in which the device 11 retries to establish the connection to the Internet 3. Steps 114, 115 are repeated until the connection is established. When the transmission of the electronic mail is completed, in Step 117, the public line 13 is disconnected, and the processing ends in Step 118.

Also in the above-described case, Steps 114, 115, 117 can be omitted in the case where the connection to the Internet is always established.

Figure 6:
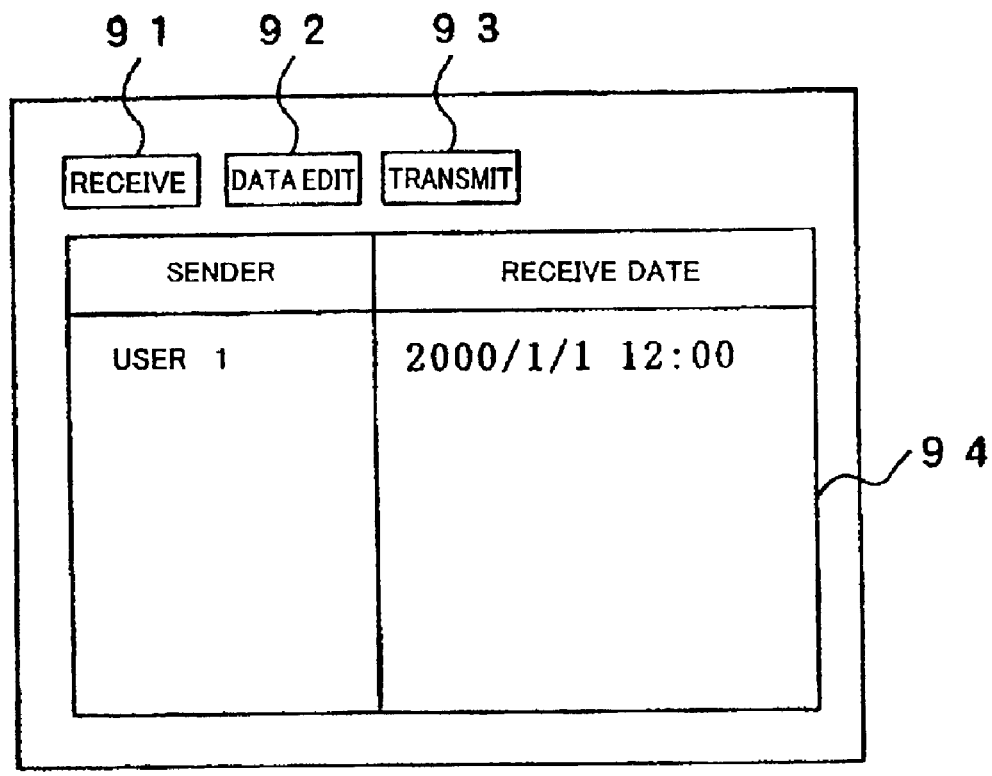
FIG. 6 is a view showing a screen displayed on a display of a server computer in a center when the electronic mail is transmitted and received.

FIG. 6 shows a screen displayed on a display (not shown) of the server computer 2 is the center in the transmission and reception of the electronic mail. The screen of FIG. 6 is provided with an electronic mail list 94 to be transmitted or received, a RECEIVE button 91 with which the electronic mail is received, a TRANSMIT button 93 with which the electronic mail is transmitted, and a DATA EDIT button 92 with which data of transmitted electronic information is displayed and data of the received electronic mail is edited. In this embodiment, when the log information of the operating state contains the image information, the corresponding electronic mail is clicked to allow the corresponding image to be displayed by superimpose or the like.

Figure 7:
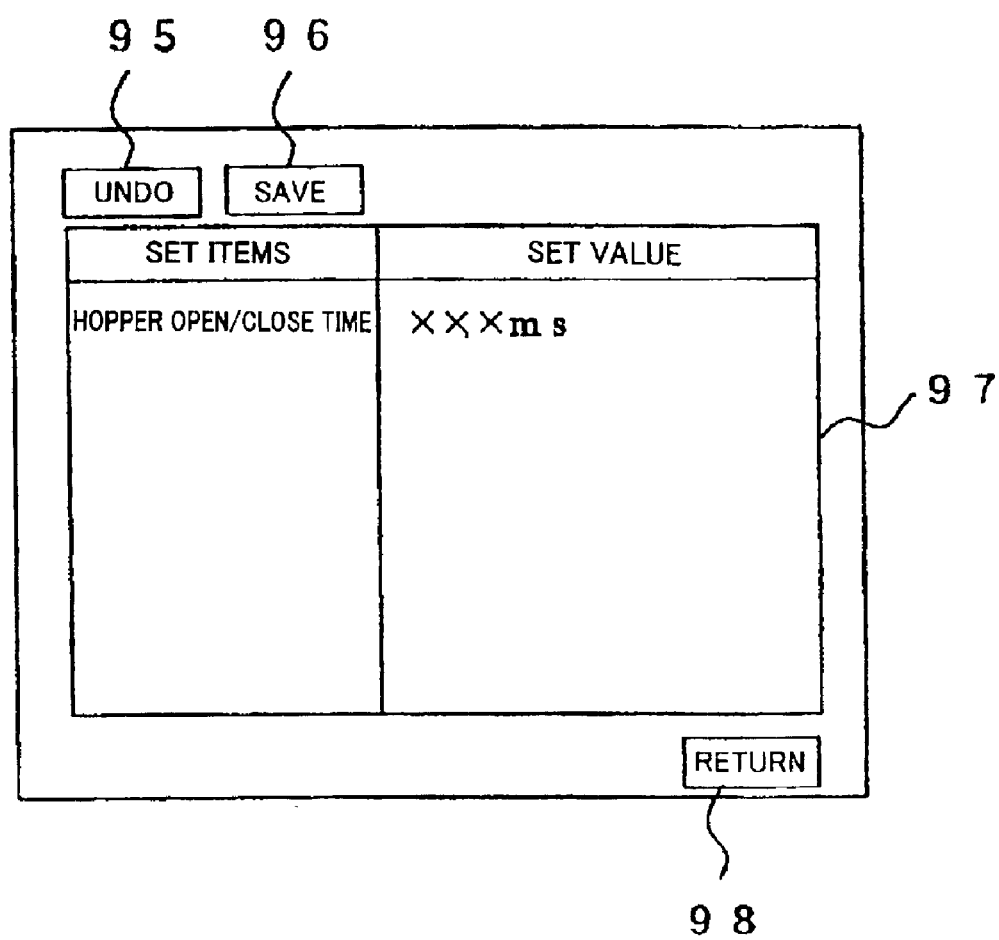
FIG. 7 is a view showing an edit screen displayed with a click of a data edit button of FIG. 6.

In this embodiment, an edit screen is displayed as shown in FIG. 7 by clicking the DATA EDIT button 92. A set value edit list 97 is displayed on the edit screen and editing of the set values can be performed on the set value edit list 97. In addition, in this embodiment, the screen is provided with an UNDO button 95 with which the editing is undone and a SAVE button 96 with which an edit result on the set value edit list 97 is saved. By clicking a RETURN button 98, this screen returns to the above-described screen of FIG. 6. Thus, since the electronic information can be handled in the format of the electronic mail, the setting information of the operating condition and the log information of the operating state can be handled by an operation similar to an operation for a general computer software.

The electronic mail of this embodiment may have an ASCII format or a binary format. Further, the electronic mail may have a compressed format to reduce the capacity thereof.

What is claimed is:

1. A remotely accessible combination weighing apparatus comprising:
   a weighing machine constituting the combination weighing apparatus;
   a weighing machine control portion for setting an operating condition of the weighing machine and logging an operating state of the weighing machine; and
   a communication device for transmitting and receiving electronic information including setting information of the operating condition and/or log information of the operating state via a communication medium,
   wherein the electronic information has a format of an electronic mail.

2. The remotely accessible combination weighing apparatus according to claim 1, wherein the communication medium is selected from the group consisting of a local area network, a wide area network, a public line, Internet, a value added network, a commercial network, and combinations thereof.

3. The remotely accessible combination weighing apparatus according to claim 1, wherein the communication device is selected from the group consisting of a modem, a terminal adapter, and a router.

4. The remotely accessible combination weighing apparatus according to claim 1, further comprising:
   means for storing the setting information of the operating condition and the log information of the operating state.

5. The remotely accessible combination weighing apparatus according to claim 1, wherein the log information of the operating state is selected from the group consisting of a control set value, an input key history, inter-process communication information, operation error information, and image information.

6. The remotely accessible combination weighing apparatus according to claim 1, wherein the setting information of the operating condition includes a control set value.

7. The remotely accessible combination weighing apparatus according to claim 1, further comprising electronic information analyzing means for analyzing the electronic information incorporating the setting information of the operating condition in a predetermined format to extract the setting information of the operating condition.

8. The remotely accessible combination weighing apparatus according to claim 1, further comprising electronic information creating means for incorporating the log information of the operating state into the electronic information in a predetermined format.

9. A combination weighing system comprising:
   a combination weighing apparatus having: a weighing machine constituting the combination weighing apparatus;
   a weighing machine control portion for setting an operating condition of the weighing machine and logging an operating state of the weighing machine; and
   a communication device for transmitting and receiving electronic information including setting information of the operating condition and log information of the operating state; and
   a server computer that includes a central communication device for performing communication with the communication device and manages the setting information of the operating condition and the log information of the operating state in the electronic information; and
   a communication medium via which communication is performed between the communication device and the central communication device,
   wherein the electronic information has a format of an electronic mail.

10. The combination weighing system according to claim 9, wherein the communication medium is selected from the group consisting of a local area network, a wide network, a public line, Internet, a value added network, a commercial network, and combinations thereof.

11. The combination weighing system according to claim 9, wherein the communication device of the combination weighing apparatus is selected from the group consisting of a modem, a terminal adapter, and a router.

12. The combination weighing system according to claim 9, further comprising means for storing the setting information of the operating condition and the log information of the operating state.

13. The combination weighing system according to claim 9, wherein the log information of the operating state is selected from the group consisting of a control set value, an input key history, inter-process communication information, operation error information, and image information.

14. The combination weighing system according to claim 9, wherein the setting information of the operating condition includes a control set value.

15. The combination weighing system according to claim 9, wherein the server computer further comprises electronic information creating means for incorporating the setting information of the operating condition into the electronic information in a predetermined format, and the combination weighing apparatus further comprises electronic information analyzing means for analyzing the electronic information incorporating the setting information of the operating condition in the predetermined format to extract the setting information of the operating condition.

16. The combination weighing system according to claim 9, wherein the combination weighing apparatus further comprises electronic information creating means for incorporating the log information of the operating state into the electronic information in a predetermined format, and the server computer further comprises electronic information analyzing means for analyzing the electronic information incorporating the log information of the operating state in the predetermined format to extract the log information of the operating state.

* * * * *

UNITED STATES PATENT AND TRADEMARK OFFICE
CERTIFICATE OF CORRECTION

PATENT NO.         : 6,970,094 B2
APPLICATION NO. : 10/031560
DATED                : November 29, 2005
INVENTOR(S)       : Yamashita et al.

Page 1 of 1

It is certified that error appears in the above-identified patent and that said Letters Patent is hereby corrected as shown below:

TITLE PG. ITEM (75) please delete "Akashi" under "Kazuhiko Yamashita and Masafumi Takimoto" and insert -- Hyogo --.

In the Claims:

In Claim 11, column 10, line 3, please delete "a wide network" and insert -- a wide area network --.

Signed and Sealed this

Twelfth Day of September, 2006

JON W. DUDAS
*Director of the United States Patent and Trademark Office*